United States Patent [19]

Takeda et al.

[11] Patent Number: 5,008,348

[45] Date of Patent: Apr. 16, 1991

[54] INFUSIBILIZATION OF ORGANIC SILAZANE POLYMERS

[75] Inventors: Yoshihumi Takeda; Minoru Takamizawa; Akira Hayashida, all of Joetsu, Japan

[73] Assignee: Shin-Etsu Chemical Co., Ltd., Tokyo, Japan

[21] Appl. No.: 371,716

[22] Filed: Jun. 27, 1989

[30] Foreign Application Priority Data

Jun. 30, 1988 [JP] Japan ................................ 63-163592
Jul. 26, 1988 [JP] Japan ................................ 63-186324

[51] Int. Cl.[5] .......................................... C08F 283/00
[52] U.S. Cl. .................................... 525/474; 525/477; 525/475
[58] Field of Search .................. 524/439, 432, 174; 501/92; 428/446; 525/474, 475, 477

[56] References Cited

U.S. PATENT DOCUMENTS

| 4,730,026 | 3/1988 | Bolt et al. | 525/475 |
| 4,767,831 | 8/1988 | Bartos et al. | 525/474 |
| 4,869,854 | 9/1989 | Takeda et al. | 528/31 |

*Primary Examiner*—Melvyn I. Marquis
*Attorney, Agent, or Firm*—McAulay Fisher Nissen Goldberg & Kiel

[57] ABSTRACT

An infusible organic silazane polymer is prepared by melting, shaping, and infusibilizing an organic silazane polymer. The infusibilizing step includes two steps of treating the shaped polymer with a gas containing the vapor of an infusibilizing silicon, boron, phosphorus or metal compound and further treating with a water vapor-containing gas or ammonia gas. The infusible polymer is efficiently sintered into ceramic fibers without fusion bond.

20 Claims, No Drawings

INFUSIBILIZATION OF ORGANIC SILAZANE POLYMERS

This invention generally relates to the preparation of ceramics by a precursor method. More particularly, it relates to a method for infusibilizing an organic silazane polymer as a ceramic precursor in order that it can be pyrolyzed while maintaining the desired shape.

BACKGROUND OF THE INVENTION

Ceramics materials are now of great interest because of heat resistance, abrasion resistance, high-temperature strength and other useful properties. However, it is very difficult to machine ceramics because they are hard and brittle. For this reason, ceramic articles are generally prepared by a powder sintering method comprising molding powder ceramic material into a desired shape as by compaction and sintering the molded material. Also useful is a precursor method comprising melting an organic polymer as a ceramic precursor or dissolving the polymer in a solvent and shaping the melt or solution into a desired shape. The shaped polymer is then sintered to convert the material into inorganic. The precursor method has the advantage that there can be prepared ceramic articles of complex shapes which would otherwise be almost impossible to form by the powder sintering method. Articles of special shape such as fibers and sheets can be prepared by the precursor method.

Among materials generally known as ceramics, SiC and $Si_3N_4$ are particularly of great importance because of their high-temperature properties. More particularly, SiC has good heat resistance and high-temperature strength and $Si_3N_4$ is excellent in thermal shock resistance and fracture toughness. The inventors proposed a process for manufacturing organic silazane polymers for use in the manufacture of $SiC-Si_3N_4$ ceramic materials by the precursor method and a process for manufacturing ceramics from the polymers as disclosed in Takamizawa et al., U.S. Pat. No. 4,771,118, U.S. Serial No. 114,111, filed Oct. 27, 1987, now U.S. Pat. No. 4,869,854 or West German Offenlegungsschrift DE 3736914 A1, and Japanese Patent Application No. 313264/1987.

In general, ceramic materials are prepared from ceramic precursors by melting, molding, and then infusibilizing the ceramic precursors. The infusibilized precursors are then pyrolyzed into ceramic materials. The infusibilizing step involved in this procedure is usually carried out by several well-known methods. There were proposed various methods including (1) air oxidation, (2) exposure to steam or steam and oxygen, (3) ultraviolet exposure, (4) electron beam exposure, and (5) use of various organic silicon compounds.

These methods have the following problems. Methods (1) and (2) which require only heating in air are widely used because of ease of treatment. However, these methods not only need a great amount of thermal energy, but also yield ceramic materials having a high content of oxygen at the sacrifice of high strength, high modulus, and other characteristics inherent to ceramics.

Unlike methods (1) and (2), methods (3) and (4) have advantages that the energy cost is reduced and they avoid contamination with oxygen. However, these methods require an increased dose of ultraviolet or electron radiation for practically sufficient infusibilization, and equipment for such exposure is very expensive. These methods are commercially unacceptable in these respects.

Method (5) is typically by infusibilizing polymers having an $R_3SiNH-$ radical with various organic silicon compounds such as silicon tetrachloride and trichlorosilane or metal chlorides such as $BCl_3$ and $SnCl_4$ as disclosed in U.S. Pat. No. 4,535,007. The inventors have found that this method is not effective at all t organic silazane polymers free of an $R_3SiNH-$ radical. When processed by this method, fibers of organic silazane polymers free of an $R_3SiNH-$ radical are fusion bonded together, losing their own shape as will be demonstrated later in Comparative Example. Since this U.S. Patent refers nowhere to the strength of ceramic fibers after pyrolysis which is the most important factor in the ceramic precursor method, it is unknown how the method is effective in infusibilizing.

Therefore, there is a need for eliminating the above-mentioned drawbacks of the prior art ceramic precursor infusibilizing methods.

SUMMARY OF THE INVENTION

An object of the present invention is to provide an economical method for infusibilizing an organic silazane polymer as a ceramic precursor in a simple and convenient manner, ensuring preparation of ceramic fibers of quality.

According to the present invention, there is provided a method for infusibilizing an organic silazane polymer, comprising the steps of melting, shaping, and then infusibilizing the organic silazane polymer, wherein the shaped polymer is treated with a gas containing the vapor of at least one compound selected from the group consisting of compounds of formulae (1) through (4) defined below, and then with a water vapor-containing gas or ammonia-containing gas for infusibilizing.

The infusibilizing compounds of formulae (1) through (4) are:

silicon compounds of formula (1):

$$R_aSiX_{4-a} \quad (1)$$

wherein R is a radical selected from the group consisting of hydrogen, lower alkyl, alkenyl, and aryl radicals, X is a chlorine, bromine or iodine atom, and letter a has a value of from 0 to 2 (both inclusive), when a is equal to 2, R radicals may be the same or different;

boron compounds of formula (2):

$$BX_3 \quad (2)$$

wherein X is as defined above;

phosphorus compounds of formula (3):

$$PX_b \quad (3)$$

wherein X is as defined above, and letter b is equal to 3 or 5; and metal compounds of formula (4):

$$MX_c \quad (4)$$

wherein M is a metal selected from the group consisting of Al, Ti, V, Fe, Ga, Ge, Zr, Nb, Sn, Sb, Te, Ta, W, and Bi, letter c is a number equal to the valence of the metal, and X is as defined above.

The method for infusibilizing an organic silazane polymer according to the present invention has overcome the aforementioned problems of the prior art methods by melting and shaping an organic silazane polymer, and treating the shaped polymer with a gas containing at least one infusibilizing agent of formulae (1) through (4) in vapor form and then with a water vapor-containing gas or ammonia-containing gas for infusibilizing. The polymers can be efficiently infusibilized in a commercially advantageous manner to ensure that ceramic fibers and sheets are eventually conveniently produced. Ceramic materials predominantly comprising SiC and $Si_3N_4$ characterized by high strength and high modulus are obtained when organic silazane polymers as will be defined later are used.

DETAILED DESCRIPTION OF THE INVENTION

The organic silazane polymer which is the starting material of the present method may be any desired one selected from conventional well-known organic silazane polymers, preferably the organic silazane polymers which are disclosed by the present inventors in the aforementioned U.S. Pat. No. 4,771,118, U.S.S.N. 114,111 filed Oct. 27, 1987, now Pat. No. 4,869,854, and Japanese Patent Application No. 313264/1987.

According to the process of U.S. Pat. No. 4,771,118, an organic silazane polymer is prepared by reacting ammonia with a mixture of methyldichlorosilane, methyltrichlorosilane and dimethyldichlorosilane to obtain an ammonolysis product, and condensing the ammonolysis product in the presence of a basic catalyst capable of deprotonation. The mixture of methyldichlorosilane, methyltrichlorosilane and dimethyldichlorosilane is preferably composed of from 55 to 80 mol% of methyldichlorosilane, from 10 to 30 mol% of methyltrichlorosilane, and from 5 to 25 mol% of dimethyldichlorosilane.

According to the process of U.S.S.N. 114,111, filed Oct. 27, 1987, now U.S. Pat. No. 4,869,854, an organic silazane polymer is prepared from a mixture of (i) at least one compound selected from the group consisting of organic silicon compounds of general formulae (I) and (II):

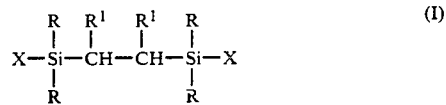

and

and (ii) an organic silicon compound of general formula

In formulae (I), (II), and (III), R is a radical selected from the group consisting of hydrogen, chlorine, bromine, methyl, ethyl, phenyl, and vinyl radicals, $R^1$ is hydrogen or a methyl radical, $R_2$ is a radical selected from the group consisting of hydrogen, methyl, ethyl, phenyl, and vinyl radicals, and X is chlorine or bromine. Like the process of U.S. Pat. No. 4,771,118, the organic silicon compound mixture is reacted with ammonia, and the resulting ammonolysis product is deprotonation condensed to form an organic silazane polymer.

The mixture is preferably composed of 0 to 30 mol% of compound (I), 0 to 30 mol% of compound (II), and 40 to 85 mol% of compound (III). More preferably, the mixture is composed of 1 to 25 mol% of compound (I), 1 to 25 mol% of compound (II), and 50 to 80 mol% of compound (III). When a mixture containing compounds (I), (II), and (III) in such a proportion is prepared, compounds (II) and (III) are preferably selected such that R2 in organic silicon compounds (II) and (III) is comprised of 55 to 90 mol% of hydrogen, 0 to 30 mol% of vinyl radical, and 0 to 30 mol% of alkyl or phenyl radical, more preferably 55 to 80 mol% of hydrogen, 0 to 25 mol% of vinyl radical and 0 to 25 mol% of alkyl or phenyl radical.

Examples of compound (I) include 1,2-bis(-chlorodimethylsilyl)ethane, 1,2-bis(dichloromethylsilyl)ethane, and 1,2bis(trichlorosilyl)ethane. Examples of compound (II) include methyltrichlorosilane, trichlorosilane, and vinyltrichlorosilane. Examples of compound (III) include methyldichlorosilane, dimethyldichlorosilane, methylvinyldichlorosilane, and vinyldichlorosilane.

Preferably, a mixture of methyldichlorosilane, methyltrichlorosilane, and an organic silicon compound of formula (I) is used. More preferred is a mixture of 55 to 90 mol% of methyldichlorosilane, 5 to 30 mol% of methyltrichlorosilane, and 2 to 30 mol% of an organic silicon compound of formula (I).

In the above-mentioned processes, it is not critical how to prepare an ammonolysis product from a mixture of methylclorosilanes. One exemplary convenient procedure is by reacting the mixture with gaseous NH3 in organic solvent, removing the ammonium chloride by-product, and stripping the reactin mixture of the organic solvent. Other procedures will occur to those skilled in the art.

Thereafter, the ammonolysis product is polymerized in the presence of a basic catalyst capable of deprotonation. Preferably, the ammonolysis product is subjected to deprotonation condensation with the catalyst in solvent to complete the reaction. The basic deprotonation catalyst includes alkali and alkaline earth metal hydrides and amides such as KH, NaH, $NaNH_2$, and $KNH_2$. The solvent used may be ethers such as THF and dialkyl ethers, aliphatic hydrocarbons such as pentane and hexane, and aromatic hydrocarbons such as benzene, toluene, and xylene. Although polymerization generally takes place at room temperature, an appropriate polymerization temperature may be selected in the range of 0° to 200° C. depending on the type of solvent.

After the completion of deprotonation condensation, the remaining basic catalyst is preferably decomposed with an electrophilic compound such as methyl iodide. The resulting insoluble matter is removed by filtration and the solvent is distilled off in vacuum.

According to the process of Japanese Patent Application No. 313264/1987, an organic silazane polymer is prepared by reacting a mixture of (i) at least one organic silicon compound of general formula (IV):

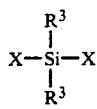

and (ii) at least one organic silicon compound of general formula (V):

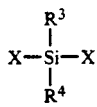

with ammonia to form a silazane compound, and polymerizing the silazane compound in the presence of an alkali catalyst such as KOH and NaOH. In formulae (IV) and (V), $R^3$ is a methyl, ethyl, or phenyl radical, $R^4$ is hydrogen or a vinyl radical, and X is chlorine or bromine.

Any desired compounds of formula (IV) may be used as long as they fall within the above definition, with dimethyldichlorosilane being most preferred.

Among compounds of formula (V), preferred are those wherein $R^4$ is a vinyl radical, that is, vinyl-containing organic silicon compounds of the formula:

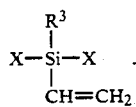

Most preferred is methylvinyldichlorosilane.

It is also preferred to use as the compound of formula (V) a mixture of a compound of formula (Va) defined above and a compound wherein $R^4$ is hydrogen, that is, an organic silicon compound of the formula:

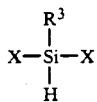

such as methyldichlorosilane.

For the mixture used herein, a compound of formula (IV) and a compound of formula (V) are preferably mixed in a proportion of from 20/80 to 90/10 in mol%, more preferably from 30/70 to 80/20 in mol%. When the compound of formula (V) is a vinyl-containing organic silicon compound of formula (Va) and a hydrogen-containing organic silicon compound of formula (Vb) as defined above, they may preferably be mixed in a proportion of from 5/95 to 95/5 in mol%, more preferably from 20/80 to 80/20 in mol%.

In forming a silazane compound by reacting a mixture of organic silicon compounds as defined above with ammonia, the manner of ammonia reaction is not particularly limited. One exemplary convenient procedure is by reacting the mixture with gaseous NH₃ in organic solvent, removing the ammonium chloride byproduct, and stripping the reactin mixture of the organic solvent. Other procedures will occur to those skilled in the art. The organic solvent used herein may be pentane, hexane, benzene, toluene, xylene, and diethyl ether, for example. The amount of ammonia used should be at least equal to, preferably about 1.2 to 1.5 times the moles of chlorine in the chlorosilanes used.

Thereafter, the resulting silazane compound is polymerized in the presence of an alkali catalyst. The preferred alkali catalysts used herein are KOH and NaOH. The amount of the catalyst added generally ranges from 0.1 to 5% by weight, preferably 0.1 to 2% by weight based on the silazane compound. Polymerization generally takes place without solvent, but may be carried out in solvent. Any desired one of commonly used organic solvents may be employed insofar as it has an appropriate boiling point compared to the polymerization temperature. The polymerization temperature varies with a particular silazane compound, but may be selected in the range between 0° C. and 350° C., preferably between 20° C. and 300° C. depending on the degree of polymerization desired for the resulting polymer. The post treatment is not particularly limited. One recommendable post treatment involves dissolving the polymer in an organic solvent, removing the insoluble by filtration, and stripping the solution of the solvent under atmospheric pressure or vacuum.

Also useful is the organic silazane polymer which is prepared by heat polymerizing hexamethylcyclotrisilazane having the unit:

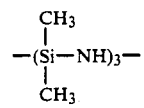

in the presence of KOH according to the teaching of Andrianov, S., Vysokomol. Soyed, 4, NOT, 1060–1063 (1962).

These organic silazane polymers are useful ceramic precursors in that they can be pyrolyzed in an inert gas containing nitrogen into ceramic materials composed of $SiCSi_3N_4$. For example, ceramic fibers may be produced by shaping the organic silazane polymer into filaments by melt spinning and subjecting the polymer filaments to pyrolysis.

This ceramic material forming process is unsuccessful unless shaped polymers are infusibilized before pyrolysis. If shaped polymers such as filaments are pyrolyzed without prior infusibilizing, they cannot maintain their shape during pyrolysis. They melt down during pyrolysis and fuse weld together in the case of filaments. Therefore, an infusibilizing step is essential prior to pyrolysis. The present invention accomplishes infusibilization in two steps. More specifically, shaped articles which are obtained by melting and shaping an organic silazane polymer are infusibilized by a first step of treating with a gas containing the vapor of at least one infusibilizing agent of formulae (1) through (4) and a second step of treating with a water vapor-containing gas or ammonia-containing gas. The term article is used to encompass articles of any shapes including ordinary threedimensional articles, fibers, filaments, and sheets.

The first infusibilizing step will be described. The infusibilizing compounds of formulae (1) through (4) are shown below.

A first group of infusibilizing agents is silicon compounds of formula (1):

$$R_a SiX_{4-a} \qquad (1)$$

wherein R is a hydrogen atom, a lower alkyl radical (preferably having 1 to 3 carbon atoms), an alkenyl radical (preferably having 2 to 3 carbon atoms), or an aryl radical (preferably having 6 to 9 carbon atoms), X is a chlorine, bromine or iodine atom, and letter a has a value of from 0 (inclusive) to 2 (inclusive), when a is equal to 2, R radicals may be the same or different.

A second group of infusibilizing agents is boron compounds of formula (2):

$$BX_3 \qquad (2)$$

wherein X is as defined above.

A third group of infusibilizing agents is phosphorus compounds of formula (3):

$$PX_b \qquad (3)$$

wherein X is as defined above, and letter b is equal to 3 or 5.

A fourth group of infusibilizing agents is metal compounds of formula (4):

$$MX_c \qquad (4)$$

wherein M is a metal selected from the group consisting of Al, Ti, V, Fe, Ga, Ge, Zr, Nb, Sn, Sb, Te, Ta, W, and Bi, letter c is a number equal to the valence of the metal, and X is as defined above.

Some preferred examples of the infusibilizing agents having formulae (1) through (4) include $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, $(CH_2=CH)C_6H_5SiCl_2$, $BCl_3$, $BBr_3$, $BI_3$, $PCl_3$, $PCl_5$, $PBr_3$, $PI_3$, $AlCl_3$, $TiCl_4$, $FeCl_3$, $VCl_4$, $GaCl_3$, $GeCl_4$, $ZrCl_4$, $NbCl_5$, $SnCl_4$, $SbCl_3$, $TaCl_5$, $TeCl_4$, $WCl_5$, and $BiCl_3$. They may be used alone or in admixture of two or more. Most preferred are $H(CH_3)SiCl_2$, $HSiCl_3$, $BCl_3$, $PCl_3$, $AlCl_3$, and $TiCl_4$.

The articles may be treated with a gas containing the infusibilizing agent in any desired manner. For example, an inert gas such as nitrogen ($N_2$), argon (Ar), and helium (He) may be used as a carrier gas. The carrier gas is passed into the infusibilizing agent and then to a region where the articles are placed whereupon the articles are contacted with the carrier gas having the vapor of the agent carried thereon. The concentration of the infusibilizing agent in the gas may be controlled to a desired level by adjusting the temperature of the infusibilizing agent source so as to give an appropriate vapor pressure. If the concentration of the agent in the gas is too high, the gas may be diluted with an inert gas. In general, the concentration of infusibilizing agent vapor is preferably controlled to 0.0001 to 0.1 mol, more preferably 0.01 to 0.05 mol of the agent per liter of the carrier gas. The treating temperature and time vary with a particular type of organic silazane polymer used. Usually, the treating temperature is a sufficiently low temperature to maintain the polymer infusible, that is, a temperature sufficiently lower than the melting point of the polymer, preferably a temperature lower by 20 to 100° C., most preferably by 25 to 80° C., than the melting point of the polymer. The treating time is a sufficient time to render the articles substantially infusible, preferably about 5 to about 240 minutes, more preferably about 10 to about 120 minutes.

At the end of the first infusibilizing step, the polymer articles become insoluble in commonly used solvents, for example, benzene, hexane, toluene, and tetrahydrofuran. However, the polymer articles resulting from only the first infusibilizing step is not fully infusible and will melt during subsequent pyrolysis as will be later demonstrated in Comparative Example. The second step of treating with a water vapor-containing gas or ammonia-containing gas is essential to enhance the infusibility of polymer articles.

The manner of treatment in the second step is not particularly limited. In the case of treatment with a water vapor-containing gas, for example, the articles resulting from the first infusibilizing step may be simply exposed in air for a predetermined time to render the articles completely infusible. The air exposure is simple, but somewhat difficult to consistently yield ceramic articles having high strength and modulus because the humidity in air is not always constant. Due to varying humidity, subsequent pyrolysis will result in articles having a varying oxygen content or fused fibers. Therefore, the second step is preferably carried out by passing air or an inert gas such as nitrogen and argon into water at a controlled temperature, more preferably bubbling air or inert gas through water at a predetermined rate, thereby forming air or inert gas containing saturated water vapor at the temperature. The resulting gas with saturated water vapor is passed over the articles for a sufficient time to complete infusibilization. The treating temperature and time vary with a particular type of organic silazane polymer used as in the first step. Usually, the treating temperature is a temperature sufficiently lower than the melting point of the polymer, preferably a temperature lower by 20 to 100° C., most preferably by 25 to 80° C., than the melting point of the polymer. The treating time is a sufficient time to complete infusibilization, preferably about 5 to about 240 minutes, more preferably about 10 to about 120 minutes. The temperature of water into which air or inert gas is bubbled at the predetermined rate may preferably vary over the range of 0 to 100° C., more preferably 0 to 70° C., most preferably 0 to 30° C.

In the case of ammonia gas treatment, infusibilizing may be completed by exposing the articles resulting from the first infusibilizing step to ammonia gas or ammonia gas diluted with an inert gas. In the second step, the ammonia gas concentration preferably ranges from 0.01 to 100% by volume, more preferably from 0.2 to 50% by volume, most preferably from 0.5 to 10% by volume. If the ammonia concentration is too high, the ammonia gas is diluted with a rare gas such as argon and helium or an inert gas such as nitrogen gas. The ammonia gas with or without a diluent gas may be passed over the articles for a sufficient time to complete infusibilization. The treating temperature and time are approximately the same as described for the water vapor treatment.

The polymeric articles thus made infusible are then sintered for pyrolysis in a conventional manner, yielding ceramic articles. For example, any one of the organic silazane polymers the inventors proposed may be shaped into fibers and infusibilized by the above-mentioned two steps. The resulting infusible fibers are sintered at high temperatures under tension or in free state, resulting in ceramic fibers composed mainly of SiC and $Si_3N_4$ and having high strength and modulus. Sintering is preferably carried out in vacuum or in an inert gas such as argon or in an atmosphere of nitrogen ($N_2$), hydrogen ($H_2$) or ammonia ($NH_3$) gas at a temperature of about 700 to about 2000° C., more preferably about 700 to about 1500° C. Also preferably, the infusible fibers are sintered under tension. Under such preferred conditions, there are produced ceramic fibers of quality as typified by a tensile strength of 200 to 300 kg/mm$^2$ and a modulus of elasticity of 15 to 25 t/mm$^2$.

EXAMPLE

Examples of the present invention are given below together with comparative examples by way of illustration and not by way of limitation.

EXAMPLE 1

A dry 2-liter four-necked flask equipped with a stirrer, a thermometer, an ammonia admission tube, and a water-cooled condenser was charged with 1500 ml of hexane. To the flask were added 83.38 grams of methyldichlorosilane, 22.59 grams of methyltrichlorosilane, and 16.0 grams of dimethyldichlorosilane. Excess gaseous ammonia was introduced into the solution at room temperature at a flow rate of 90 liter/hour for 1½hours. The total amount of ammonia added was 5.0 mol. The reaction mixture was allowed to stand at room temperature while the condenser was replaced by an air-cooled condenser for allowing the unreacted ammonia to escape from the flask. The ammonium chloride by-product was removed from the reaction mixture by filtration in a dry box. The cake was then washed three times with 1.5 liters of hexane. The filtrate was stripped of the hexane under a vacuum of 1 mmHg at 60° C. The residue or ammonolysis product was a clear free-flowing liquid in a yield of 52.0 grams.

Next, a 500-ml three-necked flask equipped with a stirrer, a thermometer, and a dropping funnel was placed in a dry box and charged with 0.4 grams of potassium hydride and 250 ml of tetrahydrofuran (THF) which had been dehydrated with NaH. The flask was taken out of the dry box and connected to a nitrogen gas tube. While the mixture was stirred at room temperature to disperse potassium hydride, 40 grams of the ammonolysis product in 100 ml of THF was slowly added to the mixture over one hour through the dropping funnel. Large amounts of gases evolved during the addition. After 2 hours, the reaction temperature was raised to the reflux temperature of THF and maintained at the temperature for a further 1½hours. The gases ceased to evolve after 3½hours from the start of reaction. The flask was cooled down to room temperature before 4 grams of methyl iodide was added, yielding a white precipitate of KI. The reaction mixture was stirred for a further 30 minutes and then distilled of the majority of THF solvent under vacuum to leave a white slurry, to which 100 ml of hexane was added. The mixture was filtered and the filtrate was stripped of the hexane under a vacuum of 1 mmHg at 180° C., yielding 36.5 grams of a silazane polymer in the form of a viscous solid. The polymer had a melting point of 143° C. and a molecular weight of 1200 as measured by a benzene molar depression of freezing point method. It was soluble in hexane, benzene, THF and other organic solvents. An IR analysis of the polymer showed absorption peaks at 3400 cm$^{-1}$ for NH, 2980 cm$^{-1}$ for C-H, 2150 cm$^{-1}$ for Si-H, and 1260 cm$^{-1}$ for Si-CH$_3$.

The silazane polymer designated Polymer A was heated at 160° C. and melt spun through a spinneret having an orifice of 0.2 mm in diameter. The resulting green or preceramic filaments had a diameter of 12 to 13 μm.

The filaments in a weight of 0.05 to 0.2 grams were rested in an alumina boat, which was placed in a mullite tube furnace of 50 mm in diameter. After the furnace was purged with an inert gas of $N_2$ or Ar, the furnace was ready for the first infusibilizing step. Nitrogen gas was passed through a bubbling apparatus charged with trichlorosilane, obtaining a nitrogen gas containing trichlorosilane gas in a predetermined concentration. The concentration of trichlorosilane gas was controlled in terms of temperature. The trichlorosilane-carrying nitrogen gas was passed through the furnace.

The second infusibilizing step was carried out by purging the furnace with an inert gas of $N_2$ or Ar again. The filaments were treated with wet air for varying time, making the filaments infusible. The wet air used herein was prepared by bubbling air into water at room temperature to form wet air having a relative humidity of 100% at room temperature. After the filaments were treated with wet air for a predetermined time, the furnace was purged with nitrogen gas again and heated to a temperature of 1200° C. at a rate of 150° C./hour in a nitrogen stream. The filaments were pyrolyzed at the temperature for 30 minutes and then cooled down.

Table 1 shows the conditions for the trichlorosilane treatment, wet air treatment, and sintering as well as the appearance of sintered filaments.

TABLE 1

| | Trichlorosilane treatment (first step) | | | Wet air treatment (second step) | | | | |
|---|---|---|---|---|---|---|---|---|
| Sample No. | Gas Conc. (mol/l) | Treat time (min.) | Sample temp. (°C.) | Water temp. (°C.) | Air bubbling (l/hr.) | Treat time (min.) | Sample temp. (°C.) | Appearance of filaments after sintering |
| 1 | 0.02 | 15 | r.t. | 25 | 13 | 15 | r.t. | some fusion bonds |
| 2 | 0.02 | 15 | r.t. | 25 | 13 | 30 | r.t. | no fusion bond, good |
| 3 | 0.02 | 15 | r.t. | 25 | 13 | 60 | r.t. | no fusion bond, good |
| 4 | 0.02 | 15 | 50 | 25 | 13 | 15 | r.t. | no fusion bond, good |
| 5 | 0.02 | 15 | 150 | 25 | 13 | 30 | 50 | no fusion bond, good |
| 6 | 0.01 | 15 | r.t. | 25 | 13 | 30 | 50 | no fusion bond, good |
| 7 | 0.005 | 15 | 50 | 25 | 13 | 40 | 50 | no fusion bond, good | r.t.: room temperature

As is evident from the data of Table 1, the sintered filaments of sample No. 1 lightly fusion bonded together in some areas. Sample Nos. 2 to 7 gave very good sintered filaments free of a fusion bond since they had been made fully infusible prior to sintering.

The sintered filaments of sample No. 5 were measured for physical properties to find a tensile strength of 250 kg/mm$^2$ and a tensile modulus of 25 t/mm$^2$ at a filament diameter of 9.3 μm. They were found to be ceramic filaments composed mainly of SiC and Si$_3$N$_4$ and having a composition: Si 56.7%, C. 16.8%, N 17.6%, and O 8.9%.

EXAMPLE 2

Filaments having a diameter of 12 to 13 μm obtained by melt spinning Polymer A in Example 1 were infusibilized and sintered by the same procedures as in Example 1 except that the infusibilizing agent used in the first infusibilizing step was changed.

Table 2 shows the conditions for the first and second infusibilizing steps as well as the appearance of sintered filaments.

TABLE 2

| Sample No. | First step | | | | Second step (Wet air treatment) | | | | Appearance of filaments after sintering |
|---|---|---|---|---|---|---|---|---|---|
| | Type of agent | Gas conc. (mol/l) | Treat time (min.) | Sample temp. (°C.) | Water temp. (°C.) | Air bubbling (1/hr.) | Treat time (min.) | Sample temp. (°C.) | |
| 8 | H(CH₃)SiCl₂ | 0.02 | 15 | r.t. | 25 | 10 | 40 | r.t. | good |
| 9 | SiCl₄ | 0.02 | 15 | r.t. | 25 | 10 | 40 | r.t. | good |
| 10 | BCl₃ | 0.02 | 15 | r.t. | 25 | 10 | 40 | r.t. | good |
| 11 | PCl₃ | 0.02 | 15 | r.t. | 25 | 10 | 40 | r.t. | good |
| 12 | TiCl₄ | 0.02 | 15 | r.t. | 25 | 10 | 40 | r.t. | good |
| 13 | AlCl₃ | 0.02 | 15 | r.t. | 25 | 10 | 40 | r.t. | slight fusion bonds |
| 14 | AlCl₃ | 0.02 | 30 | r.t. | 25 | 10 | 60 | r.t. | good | r.t.: room temperature

As is evident from the data of Table 2, better results were obtained when boron, phosphorus, titanium, and aluminum compounds were used as the infusibilizing agent in the first step instead of the silicon compound. In particular, the sintered filaments of sample No. 11 showed outstanding physical properties, a tensile strength of 280 kg/mm² and a tensile modulus of 24 t/mm² at a filament diameter of 9.5 μm.

EXAMPLE 3

The starting mixture was a mixture of methyldichlorosilane, 1,2-bis(methyldichlorosilyl)ethane, and methyltrichlorosilane in a proportion of 70:10:20 in mol%. A silazane polymer designated Polymer B was obtained by following the procedure of Example 1, that is, by reacting the chlorosilane mixture with ammonia and subjecting the ammonolysis product to deprotonation condensation in the presence of KH. The polymer had a melting point of 96° C. and a molecular weight of 1050 as measured by a benzene molar depression of freezing point method.

Using spinning equipment as in Example 1, the silazane polymer designated Polymer B was melt spun at 120° C. into preceramic filaments having a diameter of 13 to 14 μm. The filaments were placed in a mullite tube furnace, infusibilized by the same procedures as in Example 1 except that the infusibilizing agent and treating conditions were changed, and finally sintered as in Example 1.

Table 3 shows the conditions for the first and second infusibilizing steps as well as the appearance of sintered filaments.

TABLE 3

| Sample No. | First step | | | | Second step (Wet air treatment) | | | | Appearance of filaments after sintering |
|---|---|---|---|---|---|---|---|---|---|
| | Type of agent | Gas conc. (mol/l) | Treat time (min.) | Sample temp. (°C.) | Water temp. (°C.) | Air bubbling (1/hr.) | Treat time (min.) | Sample temp. (°C.) | |
| 15 | (CH₂=CH)CH₃SiCl₂ | 0.05 | 10 | r.t. | 15 | 20 | 10 | r.t. | slight fusion bonds |
| 16 | (CH₂=CH)CH₃SiCl₂ | 0.05 | 20 | r.t. | 15 | 20 | 20 | r.t. | good, no fusion bond |
| 17 | (CH₂=CH)SiCl₃ | 0.02 | 15 | 30 | 15 | 10 | 30 | r.t. | good |
| 18 | ZrCl₄ | 0.02 | 15 | 50 | 15 | 10 | 30 | r.t. | good |
| 19 | PBr₃ | 0.02 | 20 | 50 | 15 | 10 | 30 | r.t. | good |
| 20 | PCl₅ | 0.02 | 10 | 50 | 15 | 10 | 30 | r.t. | good | r.t.: room temperature

As is evident from the data of Table 3, all the samples showed very good results, except sample No. 15 in which the sintered filaments were lightly fusion bonded together.

EXAMPLE 4

A silazane polymer was prepared from a halosilane mixture by the process of Japanese Patent Application No. 313264/1987. The starting mixture was a mixture of dimethyldichlorosilane and methylvinyldichlorosilane in a proportion of 50:50 in mol%. The chlorosilane mixture was reacted with ammonia in hexane solvent. The resulting ammonolysis product, 30 grams, was polymerized at 280° C. in the presence of 0.3 grams of KOH, yielding 23 grams of a silazane polymer designated Polymer C. The polymer had a melting point of 113° C. and a molecular weight of 1511 as measured by a benzene molar depression of freezing point method. An IR analysis showed absorption peaks at 3400 cm$^{-1}$ for NH, 2980 cm$^{-1}$ for CH, 1420 cm$^{-1}$ for CH₂=CH, and 1260 cm$^{-1}$ for Si-CH₃.

Polymer C was melt spun at 130° C. by the same procedure as in Example 1, forming pre-ceramic filaments having a diameter of 10 to 12 μm. The filaments were placed in a mullite tube furnace, infusibilized by the same procedures as in Example 1 except that the infusibilizing agent and treating conditions were changed, and finally pyrolyzed at 1200° C. as in Example 1.

Table 4 shows the conditions for the first and second infusibilizing steps as well as the appearance of sintered filaments.

TABLE 4

| Sample No. | First step | | | Second step (Wet air treatment) | | | | Appearance of filaments after sintering |
|---|---|---|---|---|---|---|---|---|
| | Type of agent | Gas conc. (mol/l) | Treat time (min.) | Sample temp. (°C.) | Water temp. (°C.) | Air bubbling (1/hr.) | Treat time (min.) | Sample temp. (°C.) | |
| 21 | $CH_3SiCl_3$ | 0.02 | 15 | r.t. | 15 | 20 | 40 | r.t. | good, no fusion bond |
| 22 | $(CH_3)_2SiCl_2$ | 0.02 | 30 | 40 | 15 | 20 | 60 | r.t. | good, no fusion bond |
| 23 | $(CH_2=CH)SiCl_3$ | 0.02 | 15 | r.t. | 15 | 20 | 40 | r.t. | good, no fusion bond |
| 24 | $FeCl_3$ | 0.1 | 30 | 50 | 15 | 20 | 60 | 50 | good, no fusion bond |
| 25 | $SnCl_4$ | 0.05 | 30 | 50 | 15 | 20 | 60 | 50 | good, no fusion bond | r.t.: room temperature

As is evident from the data of Table 4, all the samples gave filaments of excellent quality in which no fusion bond occurred after sintering.

EXAMPLE 5

An organic silazane polymer was prepared according to the process of U.S. Patent No. 4,771,118. A dry 2-liter four-necked flask equipped with a stirrer, a thermometer, an ammonia admission tube, and a water-cooled condenser was charged with 1500 ml of hexane. To the flask were added 80.5 grams of methyldichlorosilane, 14.9 grams of methyltrichlorosilane, and 25.8 grams of dimethyldichlorosilane. Excess gaseous ammonia was introduced into the solution at room temperature at a flow rate of 90 liter/hour for 1¼ hours. The total amount of ammonia added was 5.0 mol. The reaction mixture was allowed to stand at room temperature while the condenser was replaced by an air-cooled condenser for allowing the unreacted ammonia to escape from the flask. The ammonium chloride by-product was removed from the reaction mixture by filtration in a dry box. The cake was then washed three times with 1.5 liters of hexane. The filtrate was stripped of the hexane under a vacuum of 1 mmHg at 60° C. The residue or ammonolysis product was a clear free-flowing liquid in a yield of 52.5 grams.

Next, a 500-ml three-necked flask equipped with a stirrer, a thermometer, and a dropping funnel was placed in a dry box and charged with 0.4 grams of potassium hydride and 250 ml of tetrahydrofuran (THF) which had been dehydrated with NaH. The flask was taken out of the dry box and connected to a nitrogen gas tube. While the mixture was stirred at room temperature to disperse potassium hydride, 52.5 grams of the ammonolysis product in 100 ml of THF was slowly added to the mixture over one hour through the dropping funnel. Large amounts of gases evolved during the addition. After 2 hours, the reaction temperature was raised to the reflux temperature of THF and maintained at the temperature for a further 1½ hours. The gases ceased to evolve after 3½ hours from the start of reaction. The flask was cooled down to room temperature before 4 grams of methyl iodide was added, yielding a white precipitate of KI. The reaction mixture was stirred for a further 30 minutes and then distilled of the majority of THF solvent under vacuum to leave a white slurry, to which 100 ml of hexane was added. The mixture was filtered and the filtrate was stripped of the hexane under a vacuum of 1 mmHg at 180° C., yielding 49 grams of a silazane polymer in the form of a viscous solid. The polymer had a melting point of 128° C. and a molecular weight of 1365 as measured by a benzene molar depression of freezing point method. It was soluble in hexane, benzene, THF and other organic solvents. An IR analysis of the polymer showed absorption peaks at 3400 $cm^{-1}$ for NH, 2980 $cm^{-1}$ for C-H, 2150 $cm^{-1}$ for Si-H, and 1260 $cm^{-1}$ for Si-CH$_3$.

The silazane polymer designated Polymer D was heated at 150° C. and melt spun through a spinneret having an orifice of 0.2 mm in diameter. The resulting green or preceramic filaments had a diameter of 13 to 14 μm.

The filaments in a weight of 0.1 to 0.2 grams were rested in an alumina boat, which was placed in a mullite tube furnace of 50 mm in diameter. After the furnace was purged with an inert gas of $N_2$ or Ar, the furnace was ready for the first infusibilizing step. Nitrogen gas was passed through a bubbling apparatus charged with trichlorosilane, obtaining a nitrogen gas containing trichlorosilane gas in a predetermined concentration. The concentration of trichlorosilane gas was controlled in terms of temperature. The trichlorosilane-carrying nitrogen gas was passed through the furnace.

The second infusibilizing step was carried out by purging the furnace with an inert gas of $N_2$ or Ar again. The filaments were treated with ammonia gas or ammonia gas diluted with nitrogen gas in the concentration shown in Table 5, making the filaments infusible. After the filaments were treated with ammonia gas for a predetermined time, the furnace was purged with nitrogen gas again and heated to a temperature of 1200° C. at a rate of 150° C./hour in a nitrogen stream. The filaments were pyrolyzed at the temperature for 30 minutes and then cooled down.

Table 5 shows the conditions for the trichlorosilane treatment, ammonia gas treatment, and sintering as well as the appearance of sintered filaments.

TABLE 5

| Sample No. | Trichlorosilane treatment (first step) | | | Ammonia gas treatment (second step) | | | Appearance of filaments after sintering |
|---|---|---|---|---|---|---|---|
| | Gas conc. (mol/l) | Treat time (min.) | Sample temp. (°C.) | Gas conc. (vol %) | Treat time (min.) | Sample temp. (°C.) | |
| 26 | 0.001 | 15 | r.t. | 7 | 5 | r.t. | slight fusion bonds |
| 27 | 0.001 | 15 | r.t. | 7 | 30 | r.t. | no fusion bond, good |
| 28 | 0.001 | 30 | 50 | 7 | 30 | 50 | good |
| 29 | 0.001 | 30 | 80 | 7 | 30 | 80 | good |
| 30 | 0.1 | 5 | 50 | 7 | 30 | 80 | good |

TABLE 5-continued

| Sample No. | Trichlorosilane treatment (first step) | | | Ammonia gas treatment (second step) | | | Appearance of filaments after sintering |
|---|---|---|---|---|---|---|---|
| | Gas conc. (mol/l) | Treat time (min.) | Sample temp. (°C.) | Gas conc. (vol %) | Treat time (min.) | Sample temp. (°C.) | |
| 31 | 0.1 | 5 | 50 | 100 | 5 | 80 | good | r.t.: room temperature

As is evident from the data of Table 5, the sintered filaments of sample No. 26 fusion bonded together in some areas where they had been in close contact. Sample Nos. 27 to 31 gave very good sintered filaments free of a fusion bond since they had been made fully infusible prior to sintering.

The sintered filaments of sample No. 28 were measured for physical properties to find a tensile strength of 240 kg/mm$^2$ and a tensile modulus of 24 t/mm$^2$ at a filament diameter of 10.4 μm. They were found to be ceramic filaments composed mainly of SiC and Si$_3$N$_4$ and having a composition: Si 61.47%, C 18.56%, and N 19.97%.

EXAMPLE 6

Filaments having a diameter of 12 to 13 μm obtained by melt spinning Polymer D in Example 5 were infusibilized and sintered by the same procedures as in Example 5 except that the infusibilizing agent used in the first infusibilizing step was changed.

Table 6 shows the conditions for the first and second infusibilizing steps as well as the appearance of sintered filaments.

showed outstanding physical properties, a tensile strength of 250 kg/mm$^2$ and a tensile modulus of 23 t/mm$^2$ at a filament diameter of 9.2 μm.

EXAMPLE 7

The starting mixture was a mixture of methyldichlorosilane, 1,2-bis(methyldichlorosilyl)ethane, and methyltrichlorosilane in a proportion of 75:10:15 in mol%. A silazane polymer designated Polymer E was obtained by following the procedure of Example 5, that is, by reacting the chlorosilane mixture with ammonia and subjecting the ammonolysis product to deprotonation condensation in the presence of KH. The polymer had a melting point of 90° C. and a molecular weight of 820 as measured by a benzene molar depression of freezing point method.

Using spinning equipment as in Example 5, the silazane polymer designated Polymer E was melt spun at 110° C. into preceramic filaments having a diameter of 13 to 14 μm. The filaments were placed in a mullite tube furnace, infusibilized by the same procedures as in Example 5 except that the infusibilizing agent and treating conditions were changed, and finally sintered as in Example 5.

TABLE 6

| Sample No. | Type of agent | First step | | | Second step (Ammonia gas treatment) | | | Appearance of filaments after sintering |
|---|---|---|---|---|---|---|---|---|
| | | Gas Conc. (mol/l) | Treat time (min.) | Sample temp. (°C.) | Gas conc. (vol %) | Treat time (min.) | Sample temp. (°C.) | |
| 32 | H(CH$_3$)SiCl$_2$ | 0.02 | 15 | 50 | 10 | 30 | 50 | good |
| 33 | SiCl$_4$ | 0.02 | 15 | 100 | 10 | 30 | 100 | good |
| 34 | BCl$_3$ | 0.02 | 30 | 50 | 10 | 30 | 50 | good |
| 35 | PCl$_3$ | 0.02 | 30 | 100 | 10 | 30 | 100 | good |
| 36 | TiCl$_4$ | 0.05 | 30 | 100 | 10 | 30 | 100 | slight fusion bonds |
| 37 | AlCl$_3$ | 0.05 | 30 | 100 | 10 | 30 | 100 | slight fusion bonds |
| 38 | 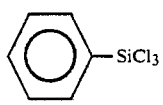 C$_6$H$_5$—SiCl$_3$ | 0.1 | 15 | 100 | 10 | 30 | 100 | good | r.t.: room temperature

As is evident from the data of Table 6, better results were obtained when boron, phosphorus, titanium, and aluminum compounds were used as the infusibilizing agent in the first step instead of the silicon compound. In particular, the sintered filaments of sample No. 34

Table 7 shows the conditions for the first and second infusibilizing steps as well as the appearance of sintered filaments.

TABLE 7

| Sample No. | Type of agent | First step | | | Second step (Ammonia gas treatment) | | | Appearance of filaments after sintering |
|---|---|---|---|---|---|---|---|---|
| | | Gas Conc. (mol/l) | Treat time (min.) | Sample temp. (°C.) | Gas conc. (vol %) | Treat time (min.) | Sample temp. (°C.) | |
| 39 | (CH$_2$=CH)CH$_3$SiCl$_2$ | 0.05 | 15 | r.t. | 10 | 30 | r.t. | slight fusion bonds |
| 40 | (CH$_2$=CH)CH$_3$SiCl$_2$ | 0.05 | 60 | r.t. | 10 | 60 | 50 | good, no fusion bond |
| 41 | (CH$_2$=CH)SiCl$_3$ | 0.02 | 15 | 50 | 10 | 30 | 50 | good |
| 42 | ZrCl$_4$ | 0.02 | 15 | 50 | 10 | 60 | 50 | good |
| 43 | PBr$_3$ | 0.02 | 30 | 50 | 10 | 60 | 50 | good |

TABLE 7-continued

| Sample No. | First step | | | | Second step (Ammonia gas treatment) | | | Appearance of filaments after sintering |
|---|---|---|---|---|---|---|---|---|
| | Type of agent | Gas Conc. (mol/l) | Treat time (min.) | Sample temp. (°C.) | Gas conc. (vol %) | Treat time (min.) | Sample temp. (°C.) | |
| 44 | PCl₅ | 0.02 | 30 | 50 | 10 | 60 | 50 | good | r.t.: room temperature

As is evident from the data of Table 7, all the samples showed very good results except sample No. 39 in which the sintered filaments were lightly fusion bonded together.

EXAMPLE 8

A silazane polymer was prepared from a halosilane mixture according to the process of Japanese Patent Application No. 313264/1987. The starting mixture was a mixture of dimethyldichlorosilane and methylvinyldichlorosilane in a proportion of 50:50 in mol%. The chlorosilane mixture was reacted with ammonia in hexane solvent. The resulting ammonolysis product, 30 grams, was polymerized at 280° C. in the presence of 0.3 grams of KOH, yielding 24 grams of a silazane polymer designated Polymer F. The polymer had a melting point of 116° C. and a molecular weight of 1520 as measured by a benzene molar depression of freezing point method. An IR analysis showed absorption peaks at 3400 cm$^{-1}$ for NH, 2980 cm$^{-1}$ for C-H, 1420 cm$^{-1}$ for $CH_2=CH$, and 1260 cm$^{-1}$ for Si-CH₃.

Polymer F was melt spun at 135° C. by the same procedure as in Example 5, forming pre-ceramic filaments having a diameter of 12 to 13 μm. The filaments were placed in a mullite tube furnace, infusibilized by the same procedures as in Example 5 except that the infusibilizing agent and treating conditions were changed, and finally pyrolyzed at 1200° C. as in Example 5.

Table 8 shows the conditions for the first and second infusibilizing steps as well as the appearance of sintered filaments.

COMPARATIVE EXAMPLE

Using spinning equipment as in Example 1, the silazane polymers A to F prepared in the preceding Examples were melt spun into filaments having a diameter of 12 to 14 μm. By approximately following the procedures of Example 1, the filaments of each lot in a weight of 0.05 to 0.2 grams were rested in an alumina boat, placed in a mullite tube furnace, treated with various infusibilizing agents or wet air under various conditions, and then heated at a rate of 200° C./hour and sintered at 1200° C. for 30 minutes. It was evaluated how the filaments were made infusible prior to sintering.

Table 9 shows the results of the samples in which the first step was omitted and only the second step, that is, wet air treatment was carried out for infusibilization. The wet air used was adjusted to a relative humidity of 100% at room temperature.

Table 10 shows the results of the samples in which the first step was omitted and only the second step, that is, ammonia gas treatment was carried out for infusibilization. Ammonia gas was passed without dilution at a rate of 5 liter/min.

Table 11 shows the results of the samples in which only the first step was carried out for infusibilization and the second step was omitted.

TABLE 9

| Sample No. | Type of polymer | Wet Air Treatment | | Appearance of filaments after sintering |
|---|---|---|---|---|
| | | Infusibilization | | |
| | | Sample temp. (°) | Treating time (hr.) | |
| 51 | A | r.t. | ½ | completely melted, leaving no fibrous shape |
| 52 | A | r.t. | 2 | completely melted, leaving no fibrous shape |
| 53 | A | 60 | 17 | almost melted, leaving slight fibrous shape |
| 54 | A | 60 | 30 | almost melted, leaving slight fibrous shape |
| 55 | B | r.t. | ½ | completely melted |
| 56 | B | r.t. | 10 | completely melted |
| 57 | B | 60 | 30 | almost melted |
| 58 | C | 60 | 30 | almost melted |

TABLE 8

| Sample No. | First step | | | | Second step (Ammonia gas treatment) | | | Appearance of filaments after sintering |
|---|---|---|---|---|---|---|---|---|
| | Type of agent | Gas Conc. (mol/l) | Treat time (min.) | Sample temp. (°C.) | Gas conc. (vol %) | Treat time (min.) | Sample temp. (°C.) | |
| 45 | CH₃SiCl₃ | 0.02 | 30 | 50 | 10 | 60 | 50 | good, no fusion bond |
| 46 | (CH₂=CH)SiCl₃ | 0.02 | 30 | 50 | 10 | 60 | 50 | good |
| 47 | SiCl₄ | 0.02 | 30 | 50 | 10 | 60 | 50 | good |
| 48 | HSiCl₃ | 0.02 | 15 | r.t. | 10 | 30 | 50 | good |
| 49 | SnCl₄ | 0.1 | 60 | 50 | 10 | 60 | 50 | good |
| 50 | FeCl₃ | 0.1 | 60 | 50 | 10 | 60 | 50 | good | r.t.: room temperature

As is evident from the data of Table 8, all the samples gave filaments of excellent quality in which no fusion bond occurred after sintering.

TABLE 10

| Sample No. | Type of polymer | Ammonia Treatment | | Appearance of filaments after sintering |
|---|---|---|---|---|
| | | Infusibilization | | |
| | | Sample temp. (°) | Treating time (hr.) | |
| 59 | D | r.t. | ½ | completely melted, leaving no fibrous shape |
| 60 | D | r.t. | 2 | completely melted, leaving no fibrous shape |
| 61 | D | 60 | 17 | almost melted, leaving slight fibrous shape |
| 62 | D | 60 | 30 | almost melted, leaving slight fibrous shape |

TABLE 10-continued

| | | Ammonia Treatment | | |
|---|---|---|---|---|
| | Type | Infusibilization | | Appearance |
| Sample No. | of polymer | Sample temp. (°) | Treating time (hr.) | of filaments after sintering |
| 63 | E | r.t. | ½ | completely melted |
| 64 | E | r.t. | 10 | completely melted |
| 65 | E | 60 | 30 | almost melted |
| 66 | F | 60 | 30 | almost melted |

TABLE 11

| | | | First Step Only | | | |
|---|---|---|---|---|---|---|
| | | | Infusibilization | | | |
| Sample No. | Type of polymer | Type of agent | Gas conc. (mol/l) | Treat time (min) | Sample temp. (°) | Appearance of filaments after sintering |
| 67 | A & D | HSiCl$_3$ | 0.02 | 30 | r.t. | completely fusion bonded |
| 68 | A & D | HSiCl$_3$ | 0.02 | 60 | 50 | completely fusion bonded |
| 69 | A & D | HSiCl$_3$ | 0.04 | 120 | 50 | markedly fusion bonded, leaving some fibrous shape |
| 70 | B & E | SiCl$_4$ | 0.02 | 60 | r.t. | completely fusion bonded |
| 71 | B & E | CH$_2$=CHSiCl$_3$ | 0.02 | 60 | r.t. | completely fusion bonded |
| 72 | B & E | BCl$_3$ | 0.02 | 60 | r.t. | completely fusion bonded |
| 73 | B & E | TiCl$_4$ | 0.02 | 60 | r.t. | completely fusion bonded |
| 74 | C & F | HSiCl$_3$ | 0.02 | 60 | r.t. | completely fusion bonded |
| 75 | C & F | BCl$_3$ | 0.02 | 60 | r.t. | completely fusion bonded |
| 76 | C & F | ZrCl$_4$ | 0.02 | 60 | r.t. | completely fusion bonded | r.t.: room temperature

As is evident from the results of Tables 9 to 11, a single infusibilizing step, either the first step (infusibilizing agent) or the second step (wet air or ammonia gas), was insufficient to render the filaments infusible even when treating conditions were varied over a wide range.

Sample No. 69 which retained a vague fibrous shape in some areas was measured for physical properties to find a tensile strength of 50 kg/mm$^2$ and a tensile modulus of 6 t/mm$^2$ at a filament diameter of 9.7 μm.

Several preferred embodiments have been described. Obviously many modifications and variations of the present invention are possible in the light of the above teachings. It is therefore to be understood that within the scope of the appended claims, the invention may be practiced otherwise than as specifically described.

We claim:

1. A method for infusibilizing an organic silazane polymer, comprising the steps of melting, shaping and then infusibilizing the organic silazane polymer, the infusibilizing step including contacting the shaped polymer at a sufficiently low temperature to maintain the polymer infusible with an inert gas containing the vapor of at least one compound selected from the group consisting of:

(1) silicon compounds having the formula $$R_a SiX_{4-a}$$

wherein
R is a radical selected from the group consisting of hydrogen, lower alkyl, alkenyl, and aryl radicals;
X is a chlorine, bromine or iodine atom, and
a has a value of from 0 to 2, and when a is equal to 2, R may be the same or different;

(2) boron compounds having the formula $$BX_3$$

wherein X is as defined above;

(3) phosphorus compounds having the formula $$PX_b$$

wherein
X is as defined above, and
b is equal to 3 or 5; and (4) metal compounds having the formula $$MX_c$$

wherein
M is a metal selected from the group consisting of Al, Ti, V, Fe, Ga, Ge, Zr, Nb, Sn, Sb, Te, Ta, W, and Bi,
c is a number equal to the valence of the metal and
X is as defined above,
and then exposing the shaped polymer to enhance the infusibility of polymer articles with an inert gas containing water vapors or ammonia.

2. The method of claim 1 wherein the organic silazane polymer is obtained by reacting a mixture of methyldichlorosilane, methyltrichlorosilane, and dimethyldichlorosilane with ammonia to form an ammonolysis product, and condensing the ammonolysis product in the presence of a basic catalyst capable of deprotonation.

3. The method of claim 2 wherein the mixture contains methyldichlorosilane, methyltrichlorosilane, and dimethyldichlorosilane in proportions of 55–80:10–30::5–25 in mol%.

4. The method of claim 1 wherein the organic silazane polymer is obtained by reacting a mixture of at least one member selected form the group consisting of (1) organic silicon compounds having the formula

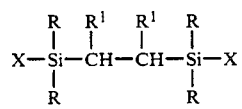

(I)

wherein
R is a radical selected form the group consisting of hydrogen, chlorine, bromine, methyl, ethyl penyl, and vinyl radicals,
R$^1$ is hydrogen or a methyl radical, and
X is chlorine or bromine;

(II)

wherein
R² is a radical selected from the group consisting of hydrogen, methyl, ethyl, phenyl, and vinyl radicals, and
X is as defined above;
and mixtures thereof; and
(2) an organic silicon compound having the formula

(III)

wherein
R² and X are as defined above,
with ammonia, and deprotonation condensing the resulting ammonolysis product.

5. The method of claim 4 wherein the mixture contains compounds of formula (I), (II) and (III) in the proportions of 1-25:1-25:50-80 in mol%.

6. The method of claim 1 wherein the organic silazane polymer is obtained by reacting a mixture of (i) at least one member of organic silicon compounds of general formula (IV):

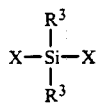
(IV)

wherein R³ is a radical selected from the group consisting of methyl, ethYl, and phenyl radicals, and X is chlorine or bromine, and (ii) at least one member of organic silicon compounds of general formula (V):

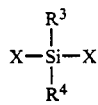
(V)

wherein R³ and X are as defined above, and R⁴ is hydrogen or a vinyl radical, with ammonia to form a silazane compound, and polymerizing the silazane compound in the presence of an alkali catalyst.

7. The method of claim 6 wherein the mixture contains compounds of formulae (IV) and (V) in proportions of from 5:95 to 95:5 in mol%.

8. The method of claim 1 wherein the organic silazane polymer is obtained by heat polymerizing hexamethylcyclotrisilazane having the unit:

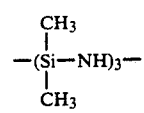

in the presence of KOH.

9. The method of claim 1 wherein the compound is selected from the group consisting of $CH_3SiCl_3$, $(CH_3)_2SiCl_2$, $(C_2H_5)SiCl_3$, $(C_2H_5)_2SiCl_2$, $C_6H_5SiCl_3$, $(C_6H_5)_2SiCl_2$, $CH_2=CHSiCl_3$, $(CH_2=CH)_2SiCl_2$, $HSiCl_3$, $H_2SiCl_2$, $SiCl_4$, $H(CH_3)SiCl_2$, $H(CH_2=CH)SiCl_2$, $(CH_2=CH)C_6H_5SiCl_2$, $BCl_3$, $BBr_3$, $BI_3$, $PCl_3$, $PCl_5$, $PBr_3$, $PI_3$, $AlCl_3$, $TiCl_4$, $FeCl_3$, $VCl_4$, $GaCl_3$, $GeCl_4$, $ZrCl_4$, $NbCl_5$, $SnCl_4$, $SbCl_3$, $TaCl_5$, $TeCl_4$, $WCl_5$, and $BiCl_3$.

10. The method of claim 1 wherein the compound is selected from the group consisting of $H(CH_3)SiCl_2$, $HSiCl_3$, $BCl_3$, $PCl_3$, $AlCl_3$, and $TiCl_4$.

11. The method of claim 1 wherein in the step of treating the shaped polymer with a gas containing the vapor of at least one compound selected from compounds of formulae (1) to (4), the shaped polymer is treated with an inert gas containing 0.0001 to 0.1 mol/liter of at least one compound selected from compounds of formulae (1) to (4) in vapor form at a temperature lower by 20 to 100° C. than the melting point of the organic silazane polymer for about 5 to about 240 minutes.

12. The method of claim 1 wherein the water vapor-containing gas is air or an inert gas containing water vapor in a saturated condition.

13. The method of claim 1 wherein the ammonia-containing gas is gaseous ammonia alone or an inert gas containing at least 0.01% by volume of gaseous ammonia.

14. The method of claim 1 wherein the step of treating the shaped polymer with water vapor-containing gas or ammoniacontaining gas is at a temperature lower by 20 to 100° C. than the melting point of the organic silazane polymer for about 5 to about 240 minutes.

15. The infusibilized organic silazane polymer of claim 1.

16. The infusibilized organic silazane polymer of claim 2.

17. The infusibilized organic silazane polymer of claim 3.

18. The infusibilized organic silazane polymer of claim 4.

19. The infusibilized organic silazane polymer of claim 5.

20. The infusibilized organic silazane polymer of claim 6.

* * * * *